Ian Arthur Rew
Robert Valentine Bell
Raymond Cooper
INVENTORS

BY
Michael P. Breston
ATTORNEY

United States Patent Office 3,428,897
Patented Feb. 18, 1969

3,428,897
ELECTRIC VOLTAGE MEASURING APPARATUS INCLUDING A CURRENT-REGULATED ZENER DIODE FOR ZERO SUPPRESSION
Ian Arthur Rew, Robert Valentine Bell, and Raymond Cooper, Enfield, England, assignors to Weston Instruments, Inc., Newark, N.J., a corporation of Texas
Filed Jan. 22, 1965, Ser. No. 427,357
Claims priority, application Great Britain, Jan. 27, 1964, 3,424/64
U.S. Cl. 324—131        6 Claims
Int. Cl. G01r 1/02

ABSTRACT OF THE DISCLOSURE

A D.C. voltmeter of the suppressed zero type is described which includes a current-regulated reference voltage source and an electrical meter or electrical meter movement. The current-regulated reference voltage source includes first and second input terminals for receiving the voltage to be measured, a first Zener diode having its cathode connected to the first input terminal, a transistor, the base of which being connected to the anode of the first Zener, and a first resistor connected to the cathode of the first Zener and to the emitter of the transistor. The base of the transistor is connected to the anode of this Zener so that the current flow between the emitter and collector of the transistor is regulated by this Zener and the first resistor. Also included as a portion of this source is a second Zener diode having its cathode connected to the collector of the transistor and its anode connected to the second input terminal to form at its cathode an output terminal for the reference voltage source.

---

This invention relates to electric voltage measurement and is more particularly concerned with the provision of an improved direct current voltmeter of the suppressed zero type.

One object of the present invention is the provision of an improved form of direct current voltmeter in which the required zero suppression is effected by wholly electrical means.

Another object of the invention is the provision of a direct current voltmeter of the suppressed zero type which comprises a circuit arrangement for providing a stable reference voltage connected for energisation by the input voltage which is to be measured and arranged to provide a reference voltage output which is substantially constant in value for all those values of said input voltage which lie within the measurement range and an electrical measuring instrument connected to be energised differentially by said constant reference voltage and said input voltage in such manner that the opposing inputs to said instrument balance when the input voltage is at the value corresponding to one of the limits of the measurement range.

In one form of the invention the measuring instrument, conveniently in the form of a moving coil type meter, is connected between the reference voltage output terminal of the circuit arrangement providing such reference voltage and a tapping point on a resistive potentiometer network connected across the input terminals to which the voltage to be measured is applied.

In another form of the invention the measuring instrument is a double winding type of moving coil meter with one of such windings connected across the source of stable reference voltage and the other winding connected to be supplied with the voltage to be measured, the respective winding currents being arranged to act in opposition to one another and to balance when the input voltage is at one of the limit values of the range which is to be measured and indicated.

In order that the nature of the invention may be more readily understood, a number of practical embodiments thereof will now be described by way of illustrative example only and with reference to the accompanying drawings wherein like parts are indicated by like reference numerals and in which:

FIGURE 2 is a circuit diagram of a modified form of the arrangement shown in FIG. 1; while

In the following description certain specific values and types of circuit components are given with relation to a voltmeter providing a particular pointer deflection scale range. It is to be understood that such values and types and the scale range value are quoted for the purpose of illustrative example only and are not to be read in any limitative sense since the invention is applicable to other and widely different ranges of voltage measurement.

Figure 1:
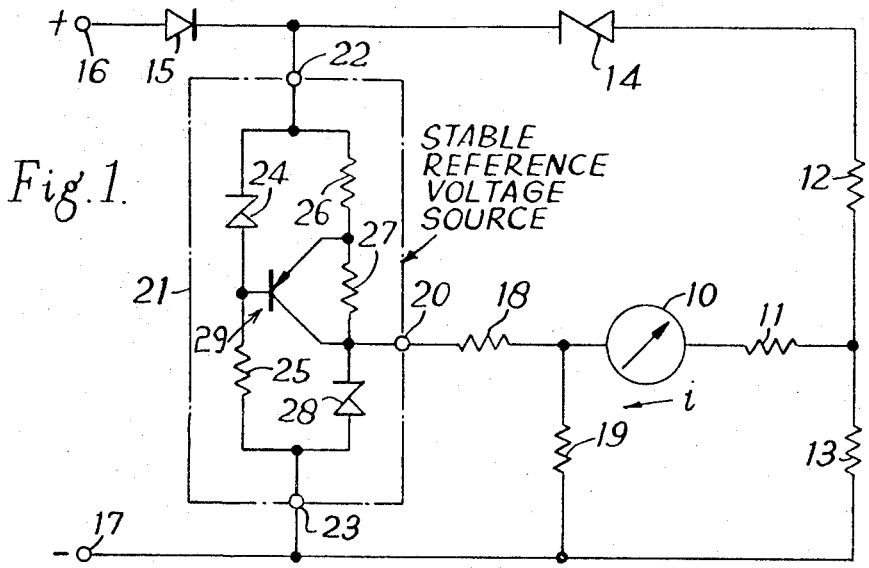
FIGURE 1 is a circuit diagram of one form of suppressed zero type of direct current voltmeter according to the present invention.

The direct current voltmeter whose circuit is shown in FIG. 1 and whose component values are quoted hereinafter is one providing a full scale deflection of 30 volts with the range of from 0 volt to 20 volts suppressed. The arrangement comprises a moving coil type measuring instrument 10 of suitable current sensitivity (500 microamps full scale deflection) having one terminal connected by way of a resistor 11 (approximately 6KΩ) to the tapping point on a resistive potentiometer consisting of two series-connected resistors 12 (approximately 2KΩ) and 13 (1KΩ). The other end of resistor 12 is connected by way of a Zener diode 14 (Mullard type OAZ 201) and a blocking diode (Transitron type 483A) to the positive instrument input terminal 16 while the opposite, negative, instrument input terminal 17 is connected directly to the opposite end of the resistor 13.

The opposite terminal of the measuring instrument 10 is connected to the common junction between a resistor 18 (100Ω) and a resistor 19 (1KΩ), the other end of the resistor 18 being connected to a reference voltage output terminal 20 of a stable reference voltage source indicated generally by the rectangle 21 and having further energisation input terminals 22, 23 which are connected respectively to the junction between the Zener diode 14 and the blocking rectifier 15 and to the negative instrument input terminal. The opposite end of the resistor 19 is also connected to the negative instrument input terminal 17.

The stable reference voltage source 21 is arranged to provide a constant output voltage between its terminals 20 and 23 for any value of input voltage applied to its energisation input terminals 22, 23, lying within the voltage range (20–30 v.) which is to be indicated by the pointer deflection of the instrument 10. The source 21 conveniently comprises a circuit network of a first series arrangement of a Zener diode 24 (Mullard type OAZ 207) and a resistor 25 (3.3KΩ) between the two energisation input terminals 22, 23 and a second series arrangement between the same input terminals of a resistor 26 (1KΩ), a resistor 27 (3.3KΩ) and a Zener diode 28 (Mullard type OAZ 201). The junction between the Zener diode 28 and the resistor 27 is connected to the reference voltage output terminal 20 and also to the collector of a pnp transistor 29 (Mullard type OC 204) whose emitter is connected to the junction between resistors 26 and 27 and whose base is connected to the junction between the Zener diode 24 and the resistor 25.

In the operation of such stable reference voltage source, when an input voltage (of sufficient value within the range to be indicated) is applied across the terminals 22, 23, a voltage held at a substantially constant value by the Zener diode 24 is applied to the base of the transistor 29. The voltage applied to the emitter of such transistor 29, as developed across the resistor 26, will be that of the aforesaid base voltage less the small base/emitter voltage and the transistor accordingly operates in a high impedance current gain circuit to provide a stable voltage between the terminals 20 and 23. The Zener diode 28 provides still further stability and effectively determines the actual value of the output reference voltage. With the component values quoted, the precise output voltage provided at the output terminals 20, 23 is within the range of 5.2 to 6 volts depending upon the Zener diode and is maintained within 1% of the particular output voltage value for any input voltage between the minimum and maximum indicated scale voltages of 20 and 30 volts respectively.

In the operation of the complete circuit arrangement the constant reference voltage source 21 provides a constant voltage between its output terminals 20 and 23 for any input voltage between 20 and 30 volts applied to the instrument input terminals 16 and 17. When the input voltage is at the minimum scale point value, i.e., 20 volts, the value of the resistor 12 is adjusted to be such that the potential across the resistor 13 is equal to that across the resistor 19 so that no current flows through the instrument 10 whose pointer is therefore at its zero deflection position. Any increase of the input voltage at terminals 16 and 17 will cause the potential across the resistor 13 to increase whereas that across the resistor 19 will remain constant or substantially so. Current now flows through the indicating instrument 10 in the direction of the arrow $i$ to cause deflection of the meter pointer up-scale. The value of the resistor 11 is adjusted to be such that the meter pointer reaches its maximum scale deflection position when the applied input voltage is at the chosen 30 volt value.

The Zener diode 14 in series with the input connection to the series network of resistors 12 and 13 is designed to prevent any meter indication when the applied voltage has any value less than the chosen minimum scale value. Under these, low voltage, conditions, the Zener diodes 24, 28 of the stable voltage reference source 21 will be non-conductive and the required reference voltage output will not be provided to the potentiometer network of resistors 18, 19. Nevertheless, a resistive bridge network exists by reason of the interconnected resistors 26, 27, 18, 19 and 12, 13 with the measuring instrument 10 operating as the bridge detector. Such bridge network is unbalanced and the resultant current through the instrument 10 also in the up-scale deflection direction of arrow $i$ would give a false reading but for the presence of the Zener diode 14 which is chosen so that it passes its breakdown value when the applied input voltage is at the lower limit value (20 v.) of the measurement range. The blocking diode 15 is for the purpose of protecting the instrument against connection with the wrong polarity.

Figure 2:
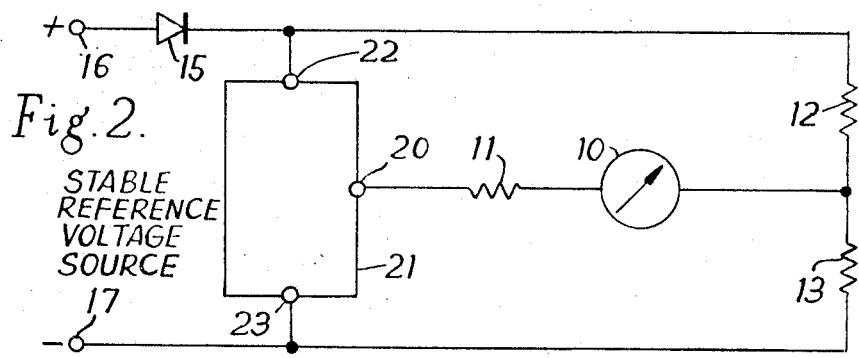

FIGURE 2 shows a modification of the circuit arrangement of FIG. 1 in which, by suitable choice of the parameters of the components of the stable reference voltage source 21, the need for the resistive potentiometer of resistors 18, 19 (FIG. 1) is eliminated. Since, in the low input voltage condition when the source 21 does not provide the required reference voltage output at terminal 20, the previous resistive bridge network condition does not exist, the Zener diode 14 of the first embodiment may be eliminated.

Figure 3:
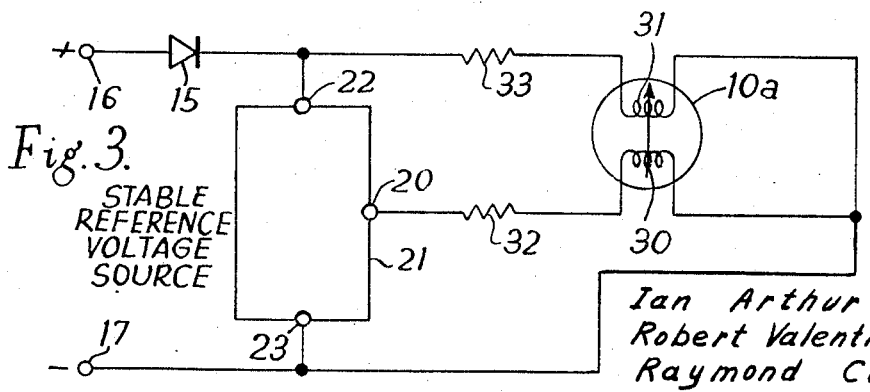
FIGURE 3 is a circuit diagram of an alternative form of construction of suppressed zero type of direct current voltmeter employing a differential or double winding type of indicating device.

FIGURE 3 shows another alternative form of construction in which the indicating measuring instrument 10a has a double-wound moving coil system of first winding 30 and second winding 31. The first winding 30 is connected in series with resistor 32 across the reference voltage output terminals 20, 23 while the second winding 31 is connected in series with resistor 33 across the energization input terminals 22, 23 of the source 21 so as to be supplied from the input source whose voltage is to be measured. The two windings 30, 31 are arranged to be energised in opposing relationship to one another and the series resistor values so chosen that the torques produced by the windings just balance when the input voltage to terminals 16, 17 has a value corresponding to the lower limit value of the range to be measured and indicated and so that the resultant of the increased torque by the winding 31 when the input voltage is at the upper limit value of the indication range and the opposing but constant torque by the winding 30 causes coil deflection to the opposite end of the meter scale.

While arrangements have been particularly described with reference to a particular form of instrument application, it will be clear that the invention is capable of adaptation to other arrangements and devices of the so-called "suppressed zero" type where a minimum or zero scale indication is required when the applied input is not itself zero.

We claim:
1. A D.C. voltmeter of the suppressed zero type comprising in combination: a current-regulated reference voltage source and an electrical meter movement; the current-regulated reference voltage source comprising, first and second input terminals for receiving the voltage to be measured, a first Zenor diode having an anode and a cathode junction, a transistor having base, emitter and collector junctions, said cathode junction being connected to said first input terminal, a first resistor connected to said cathode junction of said first Zener diode and to the emitter junction of said transistor, a second Zener diode having an anode and a cathode junction, the cathode junction of said second Zener diode being connected to the collector junction of said transistor and forming therebetween an output terminal for providing a current-regulated reference voltage, the base junction of said transistor being connected to the anode junction of said first Zener diode whereby the current flow between said emitter and collector junctions of said transistor is regulated by said first Zener diode and said first resistor, the anode of said second Zener diode being connected to the said second input terminal and providing a current-regulated stable reference voltage between said output terminal and said second input terminal, said electrical meter movement being coupled to said output terminal and to said first input terminal.

2. The voltmeter as claimed in claim 1 which additionally comprises a second resistor coupled to the base junction of said transistor and said second input terminal.

3. The voltmeter as claimed in claim 2 which additionally comprises, a third resistor coupled between the collector and emitter junctions of said transistor.

4. The voltmeter as claimed in claim 1 which further comprises, a third diode having an anode junction coupled to receive the voltage to be measured and a cathode junction connected to said first input terminal.

5. A D.C. voltmeter of the suppressed zero type comprising in combination: a current-regulated reference voltage source and an electrical meter movement; the current-regulated reference voltage source comprising, first and second input terminals for receiving the voltage to be measured, a first Zener diode having an anode and a cathode junction, a transistor having base, emitter and collector junctions, said cathode junction being connected to said first input terminal, a first resistor connected to said cathode junction of said first Zener diode and to the emitter junction of said transistor, a second Zener diode having an anode and a cathode junction, the cathode junction of said second Zener diode being connected to the collector junction of said transistor and forming therebetween an output terminal for providing a current-regulated reference voltage, the base junction of said transistor being connected to the anode junction of said first Zener diode whereby the current flow between said emitter and collector junctions of said transistor is regulated by said first Zener diode and said first resistor, the anode of said second Zener diode being connected to the said second input terminal and providing a current-regulated stable reference voltage between said output terminal and said second input terminal, said electrical meter movement being coupled to said output terminal and to said first input terminal and a third Zener diode having an anode terminal connected to said meter movement and a cathode terminal connected to said first input terminal.

6. The voltmeter as claimed in claim 5 which further comprises, a fourth diode having an anode junction connected to receive the voltage to be measured and a cathode junction connected to said first input terminal.

References Cited

UNITED STATES PATENTS

| | | | |
|---|---|---|---|
| 2,886,780 | 5/1959 | Schauffler | 324—190 |
| 3,068,410 | 12/1962 | Galman | 324—131 |
| 3,079,556 | 2/1963 | Connelly | 324—131 |

FOREIGN PATENTS

| | | |
|---|---|---|
| 780,118 | 7/1957 | Great Britain. |
| 1,264,611 | 5/1961 | France. |

OTHER REFERENCES

The Capacitor, Cornell-Dublier, vol. 22, No. 5, May 1957, "Applications of Silicon Junction Diodes," pp. 3–8.

RUDOLPH V. ROLINEC, *Primary Examiner.*

A. E. SMITH, *Assistant Examiner.*

U.S. Cl. X.R.

324—98, 119; 323—22